Dec. 11, 1956 R. J. EHRET 2,774,021
ELECTRICAL MOTOR CONTROL APPARATUS
Filed Aug. 16, 1954
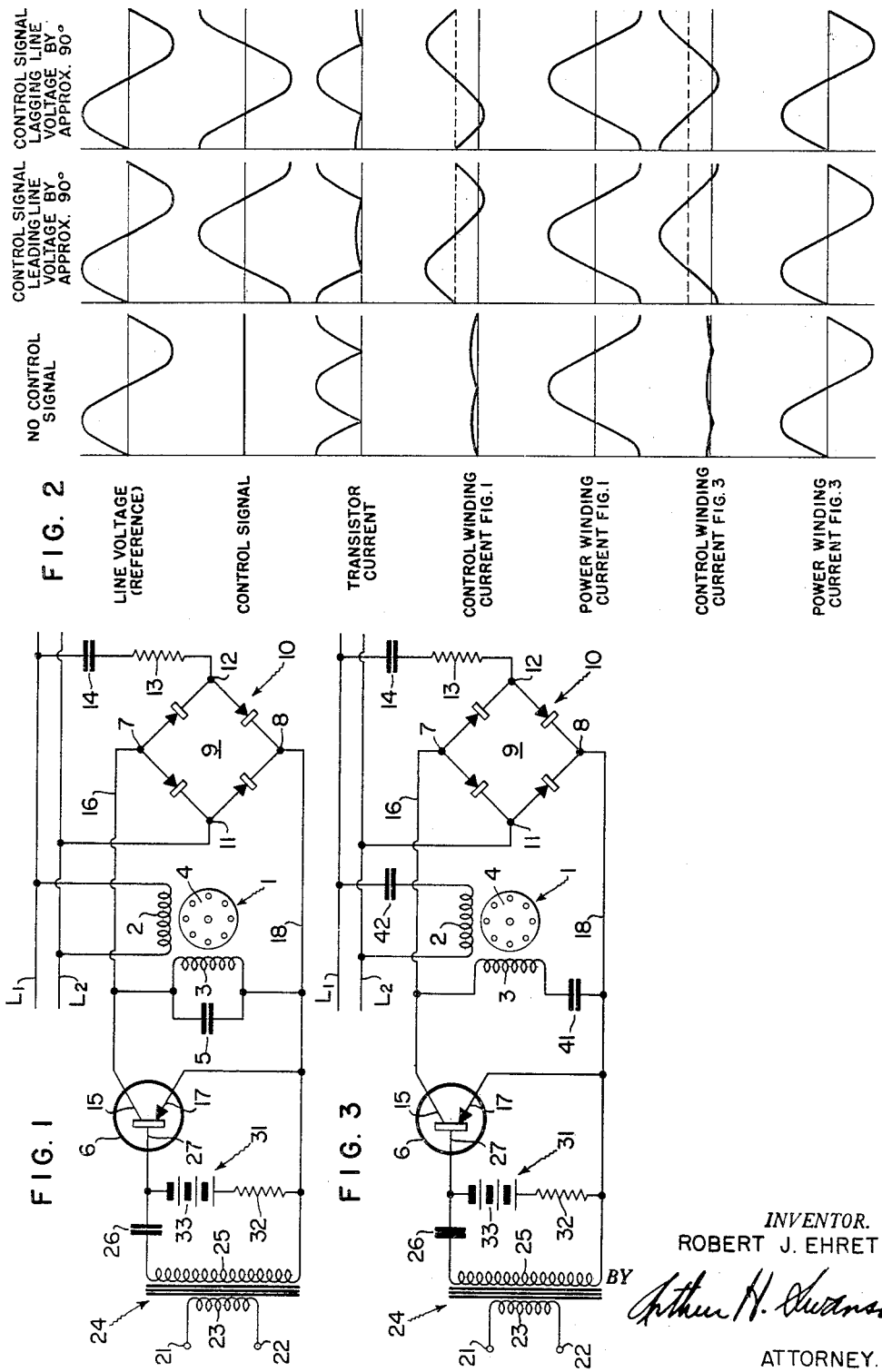
INVENTOR.
ROBERT J. EHRET
BY
*Arthur H. Swanson*
ATTORNEY.

United States Patent Office 2,774,021
Patented Dec. 11, 1956

2,774,021

ELECTRICAL MOTOR CONTROL APPARATUS

Robert J. Ehret, Philadelphia, Pa., assignor to Minneapolis-Honeywell Regulator Company, Minneapolis, Minn., a corporation of Delaware Application August 16, 1954, Serial No. 449,947

11 Claims. (Cl. 318—207)

A general object of the present invention is to provide a new and improved motor control circuit. More specifically, the present invention is concerned with a control circuit for a two phase reversible induction motor of the type employed in self-balancing measuring and control apparatus. In one form of such an apparatus, a measuring circuit unbalance is amplified by means of an electronic amplifier which is operative to impress upon the input of a motor control circuit a signal varying, in magnitude and phase, in accordance with the magnitude and direction of the unbalance. The motor control circuit, in turn, operates in accordance with the phase and magnitude of that signal to selectively energize the motor for rotation in the direction and to the extent necessary to rebalance the measuring circuit.

Accordingly, it is a specific object of the present invention to provide a new and improved motor control circuit employing a minimum of components and capable of efficiently driving a rebalancing motor in a measuring apparatus of the type described.

Motors, because of their inertia, have a tendency to coast or continue rotation after being deenergized. In a self-balancing measuring and control apparatus this tendency causes the rebalancing means to overshoot the point of balance which results in hunting. If the rebalancing motor is driven from a low impedance source, however, this tendency of the motor to coast is greatly reduced.

It is therefore another specific object of the present invention to provide an improved low impedance motor control circuit.

Transistors, unlike vacuum tubes, can be made to exhibit extremely high or extremely low impedances. These impedance characteristics of a transistor may be advantageously utilized in a motor control circuit to regulate not only its direction and rate of operation but also the rate at which the motor may be brought to a stop.

Accordingly, a further object of the present invention is to provide a new and improved transistor motor control circuit in which a transistor shunts the motor control winding in such a manner as to provide a low impedance motor driving source and thus good motor damping.

Generally, it is desirable to keep the power dissipation in transistors relatively low. In order to obtain low dissipation the transistor may be biased so that the quiescent operating point is at either end of the load line, at a point of low power dissipation. In the present invention the motor control transistor is operated at a point of high collector current and a low voltage. This method of operation is not generally used because of the low standby efficiency resulting from the power loss in the transistor collector bias supply. However, this has been overcome by the provision of a special power source which operates in such a manner as to provide efficient operation of the control circuit.

A still further object of the present invention is to operate a motor control transistor from a constant current source in such a manner that there is negligible power dissipated in the power supply.

The various features of novelty which characterize this invention are pointed out with particularity in the claims annexed to and forming a part of this specification. For a better understanding of the invention, its advantages, and specific objects attained with its use, reference should be had to the accompanying drawings and descriptive matter in which are illustrated and described preferred embodiments of this invention.

Of the drawings:

Fig. 1 is a circuit diagram of a preferred embodiment of the present invention;

Fig. 2 is a table showing voltages and currents present in different parts for the circuits shown in Figs. 1 and 3 under various operating conditions;

Fig. 3 is a circuit diagram showing the modification of the present invention as shown in Fig. 1.

Referring now to Fig. 1, the numeral 1 represents a two phase reversible induction motor having a power winding 2, a control winding 3, and a squirrel cage rotor 4. The power winding 2 is connected across a suitable source of alternating current, the conductors $L_1$ and $L_2$. Generally, the conductors $L_1$ and $L_2$ represent a source of 110 volts 60 C. P. S. alternating current. The motor control winding 3 is connected in parallel with the condenser 5 and the emitter-collector circuit of the transistor 6 across the output terminals 7 and 8 of the full wave bridge rectifier 9. The condenser 5 is selected, with respect to the motor control winding 3, so as to form therewith a substantially parallel resonant circuit. The condenser 5 provides an increase in motor power but it can be eliminated without substantially impairing the operation of the circuit.

The full wave bridge rectifier 9, the resistor 13, and the condenser 14 comprise a constant current power supply generally designated by the numeral 10. The input terminals 11 and 12 of the full wave bridge rectifier 9 are connected in series with the condenser 14 and the resistor 13 across the alternating current conductors $L_1$ and $L_2$. The resistance of the resistor 13 is comparatively small and it is included in this circuit to protect the transistor 6 from sudden surges of line current. If surge conditions are not prevalent the resistor 13 may be eliminated. The collector 15 of the transistor 6 is connected to the negative terminal 7 of the bridge rectifier 9 by means of the conductor 16. The emitter 17 of the transistor 6 is connected to the positive terminal 8 of the bridge rectifier 9 by means of the conductor 18.

The input of this circuit is across the end terminals 21 and 22 of the primary winding 23 of the input transformer 24. The input transformer 24 has a secondary winding 25 having one of its end terminals connected to the emitter 17 of the transistor 6 and its other end terminal connected through the condenser 26 to the base 27 of the transistor 6. When so connected, the emitter 17 of the transistor 6 is common to both the input and output circuits and the transistor 6 is thus connected in the well known common emitter configuration. A biasing means 31, including the resistor 32 and a source of direct current shown here as the battery 33, is connected in series across the base 27 and the emitter 17 of the transistor 6.

In considering the operation of the circuit shown in Fig. 1, the voltage across the conductors $L_1$ and $L_2$ will be considered as the reference voltage. The direction of the rotation of the motor 1 depends upon the phase relationship between the current in the control winding 3 and the current in the power winding 2. If the current in the control winding leads the current in the power winding by approximately 90 degrees, the motor 1 will turn in one direction. If, on the other hand, the current in the control winding lags the current in the power winding by approximately 90 degrees, the motor 1 will turn in the other direction.

In operation, the power winding 2 is energized continuously by current from the conductors $L_1$ and $L_2$. Due to the relatively high inductance of the control winding 2, this current lags the voltage across the conductors $L_1$ and $L_2$ by approximately 90 degrees. The magnitude and phase of the current in the motor control winding 3 is controlled by the transistor 6. Since the condenser 5 is chosen with respect to the inductance of the control winding 3 so as to form therewith a parallel resonant circuit, the parallel combination of the control winding 3, the condenser 5 and the emitter-collector circuit of the transistor 6 comprise a substantially resistive load on the rectifier 9. The condenser 14, however, connected to series with the resistor 13 and the rectifier 9 across the conductors $L_1$ and $L_2$ is selected so as to have an extremely high capacitive reactance, at the frequency of the voltage across the conductors $L_1$ and $L_2$. As a result, the pulses of full wave rectified current in the transistor 6 alternately lead and lag the voltage across the conductors $L_1$ and $L_2$ by approximately 90 degrees.

As shown in Fig. 2, in the absence of a control signal the bias supply 31 is operative to bias the transistor 6 so as to cause maximum current to flow in the transistor emitter-collector circuit. The impedance of the emitter-collector circuit of the transistor 6 under such conditions is so low compared to the impedance of the winding 3 as to prevent all but a negligible current from flowing through the winding 3. Despite the large current flow in transistor 6 very little real power is lost in the circuit while it is in this standby condition. The major voltage drop is across the condenser 14, which represents a reactive power loss not a real power loss. Thus, by employing the transistor 6 to shunt the control winding 3 and supplying current to these elements from a current source of the type shown, it is possible to achieve efficient standby operation.

If a control signal of a suitable magnitude and leading or lagging the reference voltage by approximately 90 degrees is applied to the circuit across the input terminals 21 and 22, the effect of this bias on the transistor 6 will be wholly or partly overcome during one half cycle of the pulsating unidirectional current flowing in the transistor emitter-collector circuit. Such a control signal will cause the transistor collector voltage to rise, thereby allowing current from the bridge rectifier 9 to pass through the control winding 3 instead of through the transistor 6. Thus, the bridge rectifier 9 and the capacitor 14 tend to become a constant current source applied in shunt to the motor control winding 3 and the transistor 6.

Due to the inductance of the control winding 3, the current in that winding lags the voltage across it by approximately 90 degrees. If the control signal leads the reference voltage by approximately 90 degrees, the voltage appearing across the emitter-collector circuit of the transistor 6 and the motor control winding 3, will cause unidirectional pulses of current to flow in the control winding which have an alternating current component in phase with the reference voltage. As a result of the inductance of the control winding 3 and to some extent the action of the condenser 5, the wave form of the current in the control winding approaches the form of a 60 cycle alternating current signal having a D. C. component. This 60 cycle current is in phase with the reference voltage and leads the current in the power winding by approximately 90 degrees, thus causing the motor 1 to turn in the corresponding direction. The speed of this rotation is proportional to the magnitude of the control winding current which in turn is proportional to the magnitude of the control signal.

If the control signal lags the reference voltage by approximately 90 degrees, the voltage appearing across the emitter-collector circuit of the transistor 6 and the motor control winding 3 causes pulses of unidirectional current to flow in the motor control winding which have an alternating current component 180 degrees out of phase with the reference voltage. Due to the inductance of the motor control winding 3 and to some extent the action of the condenser 5 the wave form of this current approaches the form of the 60 cycle alternating current signal having a D. C. component. This 60 cycle current is 180 degrees out of phase with the reference voltage and lags the current in the power winding by approximately 90 degrees, thus causing the motor 1 to turn in the opposite direction. Again, the speed of this rotation is proportional to the magnitude of the control signal.

As the control signal is reduced or disappears entirely, the inertia of the motor is sometimes sufficient to maintain it in rotation at a speed greater than that required by the output of the motor control circuit. When this happens, the motor acts as a generator, magnetically transferring electrical energy from the motor power winding 2 to the control winding 3, resulting in the appearance of a voltage across the winding 3. However, as the control signal is reduced, the impedance of the transistor 6 is reduced reaching a minimum when the control signal completely disappears. In this condition the transistor 6 appears to be a low impedance shunting the control winding 3. Due to this low impedance, the current which will flow in the motor control winding, as a result of the voltage produced therein by the generator action of the coasting motor, will have such a phase as to set up a flux field in the motor tending to drive it in a direction opposed to its rotation and thereby produce a braking action. In this respect, transistors, unlike vacuum tubes, can be made to exhibit extremely low impedances. By a proper selection of the transistor operating point, the impedance of the emitter-collector circuit of the transistor 6 can be made as low as a few ohms in the standby position thereby assuring good motor damping.

Referring now to Fig. 3 there is shown a modification of the circuit shown in Fig. 1. Similar reference characters have been employed to designate corresponding elements and consequently these elements are not described in detail. The arrangement of the circuit of Fig. 3 differs from the arrangement of the circuit of Fig. 1 in that the motor control winding 3 is connected in series with the condenser 41 across the output terminals of the rectifier 9 and the emitter-collector circuit of the transistor 6. The condenser 41 is selected with respect to the motor control winding 3 so as to form therewith a substantially series resonant circuit. As shown in Fig. 2, this causes the current in the control winding 3 to be in phase with the voltage across the series resonant circuit. Accordingly, it is necessary to shift the phase of the current in the power winding 2 to obtain motor operation. This is accomplished by means of the condenser 42 which is connected in series with the power winding 2 across the conductor L and $L_2$. The condenser 42 is selected with respect to the power winding 2 so as to form therewith a substantially series resonant circuit.

The effect of the condenser 41 connected in series with the control winding 3 is twofold. It results in an increase in motor power by improving the wave form of the current in the control winding. On the other hand, it increases the impedance of the control winding circuit and thus tends to reduce the damping qualities of the control circuit.

While, in accordance with the provisions of the statutes, there has been illustrated and described the best form of the invention now known, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. It should also be understood that while *pnp* junction transistors have been illustrated in the drawings that *npn* junction transistors could be employed with corresponding changes in circuit polarities.

Having now described this invention, what is claimed as new and for which it is desired to secure Letters Patent is:

1. In combination, a single stage common emitter transistor amplifier, having an input and an output, biasing means connected to the input of said amplifier for rendering it conductive in the absence of an input signal, a two phase reversible induction motor having a power winding and a control winding, said power winding being adapted to be connected to a source of alternating current, circuit means connecting said control winding in shunt with the output of said amplifier, and a power supply, said power supply having an impedance of such magnitude with respect to the magnitude of said transistor and said motor control winding that changes in the impedance of said transistor will not produce appreciable changes in the current flowing from said power supply.

2. In combination, a two phase reversible induction motor having a power winding and a control winding, said power winding adapted to be connected to a source of alternating current, a transistor amplifier for controlling the current in said control winding, said amplifier comprising, a transistor having an emitter, a collector and a base, a power supply, circuit means connecting the emitter and collector of said transistor to the power supply, an input circuit adapted to receive a control signal, circuit means connecting said input circuit to the base and emitter of said transistor, biasing means connected to said input circuit to render said transistor conductive in the absence of a control signal, and means connecting the motor control winding to the collector and the emitter of said transistor and in parallel therewith across said power supply and thus with said transistor tending to draw therefrom a substantially constant current.

3. An electronic motor drive circuit comprising in combination a two phase reversible induction motor having a power winding and a control winding, said power winding being adapted to be connected to a source of alternating current, an amplifier for supplying current to said control winding comprising a transistor having an emitter, a collector and a base, a power supply having an impedance substantially higher than that of the transistor and the motor control winding and thus tending to supply said transistor and said motor control winding with a constant current, a circuit means connecting the emitter and collector of said transistor to said power supply, an input circuit adapted to receive a phased input signal, circuit means connecting said input circuit to the base and emitter of said transistor, biasing means connected to said input circuit to render said transistor conductive in the absence of an input signal, and circuit means connecting said motor control winding to the emitter and collector of said transistor.

4. Apparatus as defined in claim 3 wherein said power supply comprises a bridge rectifier adapted to be connected to a source of alternating current through a capacitor having a high reactance at the operating frequency compared to the reactance of the transistor and motor control winding.

5. Apparatus as defined in claim 3 wherein a capacitor is connected in parallel with said motor control winding to form therewith a substantially parallel resonant circuit.

6. Apparatus as defined in claim 3 wherein a capacitor is connected in series with said motor control winding to form therewith a substantially series resonant circuit and said motor power winding is connected to a source of alternating current through a capacitor forming therewith a substantially series resonant circuit.

7. In combination, a two phase rotating field motor having a power winding and a control winding, said power winding being adapted to be connected to a source of alternating current power having a substantially fixed phase, a source of direct current, a transistor, means connecting said transistor and said control winding in parallel to said source of direct current, and input signal means for rendering said transistor alternately conductive and non-conductive in relationship to the phase of said alternating current source.

8. Apparatus as defined in claim 7 wherein said direct current source comprises a bridge rectifier connected to said alternating current source by a capacitor and a resistor in series.

9. Apparatus as defined in claim 7 wherein said transistor has a direct current bias source connected thereto to maintain said transistor in a highly conductive state in the absence of an input signal on said input signal means.

10. Apparatus as defined in claim 7 wherein said input signal means comprises a transformer having a primary winding and a secondary winding, said primary winding being adapted to be connected to a source of alternating input voltage having a reversible phase with respect to said alternating current power source, said secondary winding being connected to said transistor through a coupling condenser and biasing means comprising a resistor and a source of direct current connected in series across said transistor to render said transistor in a highly conductive state in the absence of an input signal.

11. In combination, a two phase rotating field motor having a power winding and a control winding, said power winding being adapted to be connected to a source of alternating current power having a substantially fixed phase, a pair of terminals adapted to be connected to a source of direct current, a transistor, means connecting said transistor and said control winding in parallel to said pair of terminals, and input signal means for rendering said transistor alternately conductive and non-conductive in relationship to the phase of said alternating current source.

No references cited.